UNITED STATES PATENT OFFICE 2,133,671

AZO DYESTUFFS

Hugo Schweitzer, Leverkusen-Wiesdorf, Germany, assignor to General Aniline Works, Inc., New York, N. Y., a corporation of Delaware No Drawing. Application February 24, 1936, Serial No. 65,525. In Germany February 28, 1935

12 Claims. (Cl. 8—5)

The present invention relates to a process of coloring cellulose esters, especially cellulose acetate silk, by a dyeing or printing process, with dyestuffs of the general formula:

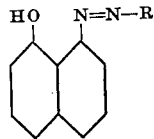

wherein R stands for the radical of an azodyestuff coupling component free from sulfonic or carboxylic acid groups. The invention further relates to the colored material, to dyeing and printing preparations and to new dyestuffs suitable for producing valuable shades on cellulose esters in accordance with the invention.

I wish it to be understood that the coloring of cellulose esters, especially cellulose acetate silk, in mixed fabrics, i. e. material containing the cellulose acetate silk in combination with other fibers, such as cotton and wool, is included within my invention.

The affinity of waterinsoluble dyestuffs to cellulose esters is depending to a high degree upon the state of dispersion of the dyestuffs. In accordance with the invention valuable deep shades are produced on cellulose esters, especially cellulose acetate silk, by applying the dyestuffs of the above identified general formula in finely divided form, their highly dispersed state being achieved by working with the sulfurous acid esters of the dyestuffs in question and splitting up the sulfurous acid ester group. This can be effected by treating the sulfurous acid esters of the dyestuffs in an aqueous medium at elevated temperature with an alkaline saponifying agent, such as a caustic alkali, an alkali metal carbonate or bicarbonate or a suitable alkali metal salt of a weak acid, exerting when coming into contact with water an alkaline reaction, for example caustic soda, caustic potash, sodium or potassium bicarbonate, sodium phosphate and the like.

A favorable modification of producing deep shades in accordance with the invention resides in performing the splitting up of the ester and the dyeing of the cellulose ester in the same bath. In carrying out the process in this manner care must be taken that only such small quantities of the alkaline saponifying agent are present in the dyeing bath that the cellulose ester is not damaged by saponification. This process can be carried out for example in such a manner that a watersoluble salt, especially an alkali metal salt, of the sulfurous acid ester of the dyestuff is dissolved in a small quantity of water, then the saponifying agent is added, the bath is filled up with water, Marseille soap is introduced and dyeing is performed in the bath in the usual manner at about 80° C. to about 90° C., say during about one hour.

The quantity of the alkaline saponifying agent used can be varied in wide limits. As a general rule there may be stated that calculated on the quantity of the dyestuff there may be used about 10 to about 100% of the saponifying agent. I wish it to be understood, however, that the limits given are only illustrative and that there may be used other quantities without departing from the spirit of my invention. In the dyeing bath the sulfurous acid ester group is split up, yielding a waterinsoluble dyestuff in a very finely divided form, which easily is adsorbed by the cellulose ester, yielding powerful shades, which are distinguished by good fastness to water and washing. The dyeings are in general well dischargeable and partially have a good fastness to light.

Most valuable in my new process have proved those dyestuffs of the general formula:

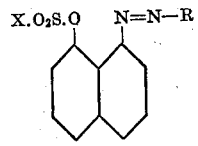

wherein X stands for a hydrogen or an alkali metal atom and R stands for the radical of a monoamine of the benzene or naphthalene series free from a sulfonic or carboxylic acid group, which has been coupled in para position to the amino group, including such amines in which the hydrogen atoms of the amino group are wholly or partially substituted by alkyl or hydroxyalkyl and including such amines in which the nitrogen atom forms part of a heterocyclic ring.

Valuable commercial preparations suitable for dyeing and printing are obtained when mixing the sulfurous acid esters of the dyestuffs coming into consideration for the present invention with the necessary quantity of the alkaline saponifying agent. Thus for example the sulfurous acid esters of the dyestuffs can be intimately mixed, say with 10–100% of an alkaline saponifying agent of the kind referred to above, yielding preparations which can be used quite in the same manner as the dyestuffs, without it being necessary to make further additions to the usual dyeing bath.

The invention is illustrated by the following examples, without being restricted thereto:

*Example 1.*—22.3 parts by weight of 1.8-aminonaphthol sulfurous acid ester are diazotized in the usual manner with 6.9 parts by weight of sodium nitrite in the presence of hydrochloric acid. This diazotization solution is added to an aqueous solution of 17.3 parts by weight of 3-amino-4-cresolmethylether (hydrochloric acid salt). Coupling begins at once. After coupling is complete, the dyestuff separated is filtered off with suction and well washed with water. For saponifying it is suspended in 500 parts by weight of water, and after addition of 68 parts by weight of caustic soda lye 43° Bé. the solution is heated to about 75° C. The dyestuff separated is filtered with suction, washed and dried. It dyes from a neutral soap bath, if desired, with addition of a dispersing agent, acetate silk clear, scarlet shades of good fastness to water and to washing and of good dischargeability. When intimately mixing the dye and not saponified dyestuff with about 25% of calcined sodium carbonate and dyeing acetate silk from the soap bath with the preparation which is easily soluble in water, the sulfurous acid ester is split up during the dyeing process, and a likewise clear scarlet is obtained.

The following table shows the results of the process with some other coupling components:

| Diazotization component | Coupling component | Shade of the saponified dyestuff |
|---|---|---|
| 1.8-aminonaphthol sulfurous acid ester | 1-naphthylamine | Ruby. |
| Do | Ethyl-1-naphthylamine | Reddish violet. |
| Do | Dihydroxyethylaniline | Red. |
| Do | Hydroxyethylmethylaniline | Do. |
| Do | Dihydroxyethyl-m-toluidine | Do. |
| Do | 1-amino-2-naphthol-ethylether | Violet. |
| Do | 1.5-aminonaphthol (coupled in an acid medium) | Bluish violet. |
| Do | Py-tetrahydro-3.7-dihydroxynaphthoquinoline of the constitution: 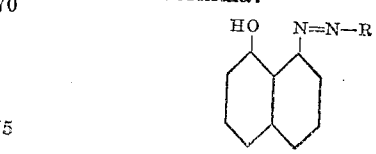 | Blue. |

*Example 2.*—0.15 gram of the dyestuff from the sulfuric acid ester of 1.8-aminonaphthol and py - tetrahydro - 3.7 - dihydroxynaphthoquinoline are dissolved together with 0.05 gram of calcined soda in a small quantity of hot water, the solution is filled up with water to 150 cc., thereto are added 6 cc. of an aqueous Marseille soap solution of 10% strength. Into this dyeing bath 5 grams of cellulose acetate silk are introduced. Dyeing is performed at 90° C. for one hour; the cellulose acetate silk is washed and dried. Clear blue shades of good fastness to washing and of good dischargeability are thus obtained.

*Example 3.*—Each one part of the dyestuffs of the table of Example 1 are intimately mixed with 0.1–1 part of an alkaline saponifying agent, especially sodium carbonate or sodium phosphate. Valuable dyeing preparations are thus obtained.

I claim:

1. Cellulose esters colored with a dyestuff of the general formula:

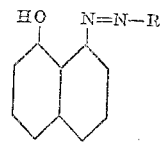

wherein R stands for the radical of an aromatic amine free from a sulfonic or carboxylic acid group.

2. Cellulose esters colored with a dyestuff of the general formula:

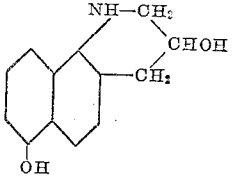

wherein R stands for the radical of an aromatic amine free from a sulfonic or carboxylic acid group, which has been coupled in para position to the nitrogen atom of the amino group, and in which the hydrogen atoms of the amino group may be substituted by alkyl or hydroxyalkyl including such amines, in which the nitrogen atom forms part of a ring system.

3. Cellulose esters colored with the dyestuff of the formula:

4. The process which comprises dyeing cellulose esters from a bath containing a dyestuff of the general formula:

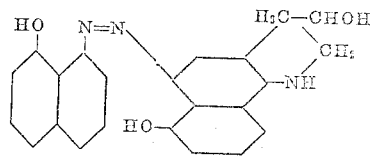

wherein X stands for an alkali metal atom and R stands for an aromatic amine free from a sulfonic or carboxylic acid group, in the presence of an agent saponifying the sulfurous acid ester.

5. A process as claimed in claim 4, in which as saponifying agent there is used an alkali metal carbonate.

6. A process as claimed in claim 4, in which about 10% to about 100%, calculated on the quantity of the dyesuff, of the saponifying agent are present in the dyeing bath.

7. Preparations for dyeing and printing, consisting of a mixture of a dyestuff of the general formula:

wherein X stands for a hydrogen or an alkali metal atom and R stands for an aromatic amine free from a sulfonic or carboxylic acid group, and of an alkaline saponifying agent.

8. Preparations for dyeing and printing. consisting of a mixture of a dyestuff of the general formula:

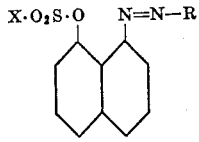

wherein X stands for a hydrogen or an alkali metal atom and R stands for an aromatic amine free from a sulfonic or carboxylic acid group, and of an alkali metal carbonate.

9. Preparations as claimed in claim 7, in which the dyestuff and the saponifying agent are present in a ratio of 1:0.1 to 1:1.

10. Preparations for dyeing and printing, consisting of about 1 part of the dyestuff of the formula:

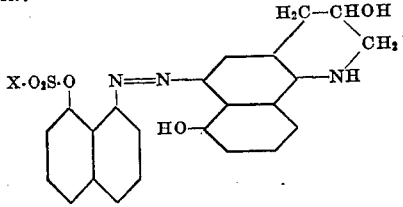

wherein X stands for a hydrogen or an alkali metal atom, and about 0.1 to about 1 part of calcined sodium carbonate.

11. Dyestuffs having in the free state the following general formula:

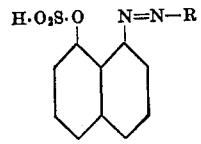

wherein R stands for the radical of a monamine of the benzene or naphthalene series free from a sulfonic or carboxylic acid group.

12. The dyestuff having in its free state the following formula:

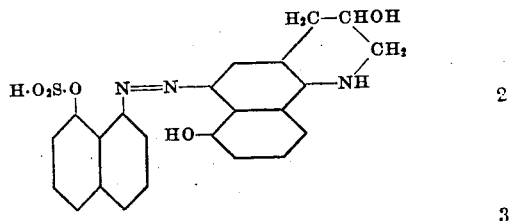

HUGO SCHWEITZER.